(12) United States Patent
Ahn et al.

(10) Patent No.: US 11,493,267 B2
(45) Date of Patent: Nov. 8, 2022

(54) REFRIGERATOR AND METHOD OF CONTROLLING THE SAME

(71) Applicant: LG ELECTRONICS INC., Seoul (KR)

(72) Inventors: Seunguk Ahn, Seoul (KR); Kyungseok Kim, Seoul (KR); Sunam Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 16/628,310

(22) PCT Filed: Jul. 5, 2018

(86) PCT No.: PCT/KR2018/007636
§ 371 (c)(1),
(2) Date: Jan. 3, 2020

(87) PCT Pub. No.: WO2019/009643
PCT Pub. Date: Jan. 10, 2019

(65) Prior Publication Data
US 2020/0158423 A1    May 21, 2020

(30) Foreign Application Priority Data
Jul. 5, 2017    (KR) .................. 10-2017-0085556

(51) Int. Cl.
*F25D 29/00*    (2006.01)
*F25D 11/02*    (2006.01)
*F25D 17/06*    (2006.01)

(52) U.S. Cl.
CPC .............. *F25D 29/00* (2013.01); *F25D 11/02* (2013.01); *F25D 17/067* (2013.01); *F25D 2700/122* (2013.01)

(58) Field of Classification Search
CPC ...... F25D 11/02; F25D 17/065; F25D 17/067; F25D 2700/12; F25D 2700/122; F25D 29/00; F25D 2600/06; F25B 2600/0253
See application file for complete search history.

(56) References Cited

U.S. PATENT DOCUMENTS 4,662,185 A    5/1987    Kobayashi et al.
7,730,732 B2    6/2010    Kaga et al.
(Continued)

FOREIGN PATENT DOCUMENTS

CN    1273790    9/2006
CN    101545706    9/2009
(Continued)

OTHER PUBLICATIONS

Machine Translation of description and claims in WO2017105047, Chung et al.; Jun. 22, 2017; eSpacenet (Year: 2017).*
(Continued)

*Primary Examiner* — Filip Zec
(74) *Attorney, Agent, or Firm* — Ked & Associates LLP

(57) ABSTRACT

A method of controlling a refrigerator is disclosed. The method includes: operating a cool air supply means with a predetermined output; a controller determining the output of the cool air supply means based on a current temperature of a storage compartment sensed by a temperature sensor while the cool air supply means operates with the predetermined output; and the controller operating the cool air supply means with the determined output. The controller determines that the output of the cool air supply means is decreased or increased when an absolute value of a difference between a previous temperature and a current temperature of the storage compartment is equal to or greater than a first reference value, and wherein the output of the cool air supply means is decreased or increased again when the absolute value of the difference between a current tempera-
(Continued)

ture of the storage compartment sensed again after a predetermined time has elapses and the previous temperature of the storage compartment is equal to or greater than the first reference value.

17 Claims, 11 Drawing Sheets

(56) References Cited

U.S. PATENT DOCUMENTS

| | | | | |
|---|---|---|---|---|
| 8,264,192 B2* | 9/2012 | Green | ............... | H02P 6/34 318/799 |
| 9,140,479 B2* | 9/2015 | Gomes | ............... | F25D 11/02 |
| 9,297,566 B2* | 3/2016 | Abbasi | ............... | F25B 49/022 |
| 2009/0171512 A1* | 7/2009 | Duncan | ............... | F24F 5/0035 700/300 |
| 2009/0216379 A1* | 8/2009 | Smith | ............... | F24F 11/30 700/275 |
| 2010/0235013 A1 | 9/2010 | Suzuki et al. | | |
| 2016/0313054 A1 | 10/2016 | Chung et al. | | |

FOREIGN PATENT DOCUMENTS

| | | | | |
|---|---|---|---|---|
| CN | 102997610 | | 3/2013 | |
| CN | 204085053 | | 1/2015 | |
| CN | 106016957 | | 10/2016 | |
| CN | 110832262 | | 2/2020 | |
| GB | 2038036 A | * | 7/1980 | ............ F25B 49/02 |
| JP | H06-300416 | | 10/1994 | |
| JP | H11-83274 | | 3/1999 | |
| JP | 2002-318067 | | 10/2002 | |
| JP | 2005-140414 | | 6/2005 | |
| JP | 2005-164192 | | 6/2005 | |
| JP | 6355325 | | 7/2018 | |
| KR | 10-1994-0004299 | | 3/1994 | |
| KR | 10-1997-0022182 | | 5/1997 | |
| KR | 10-1997-0070868 | | 11/1997 | |
| KR | 10-0208018 | | 7/1999 | |
| KR | 10-2007-0061946 | | 6/2007 | |
| KR | 10-2009-0007975 | | 1/2009 | |
| KR | 10-2011-0080062 | | 7/2011 | |
| KR | 10-2016-0125060 | | 10/2016 | |
| KR | 10-2017-0027630 | | 3/2017 | |
| KR | 10-2017-0071301 | | 6/2017 | |
| RU | 2 488 750 | | 7/2013 | |
| WO | WO 2017/105047 | | 6/2017 | |

OTHER PUBLICATIONS

European Search Report dated Mar. 4, 2021 issued in Application No. 18827636.4.
Chinese Office Action dated Feb. 2, 2021 issued in Application No. 201880045301.2.
International Search Report dated Oct. 12, 2018 issued in Application No. PCT/KR2018/007636.
Russian Notice of Allowance dated Jun. 25, 2020 issued in Application No. 2020104736 (English translation attached).
European Search Report dated Mar. 4, 2021 issued in Application No. 18827376.7.
Korean Notice of Allowance dated Oct. 6, 2021 issued in Application No. 10-2017-0085556.
Korean Office Action dated Mar. 24, 2022 issued in KR Application No. 10-2022-0001389.
Chinese Office Action dated Apr. 29, 2022 issued in CN Application No. 201880045301.2.
"Cold Chain Logistics," published by China Material Publishing Company (Year: 2012).
Korean Notice of Allowance dated Jul. 13, 2022 issued in KR Application No. 10-2022-0001389.

* cited by examiner

[Fig. 6]
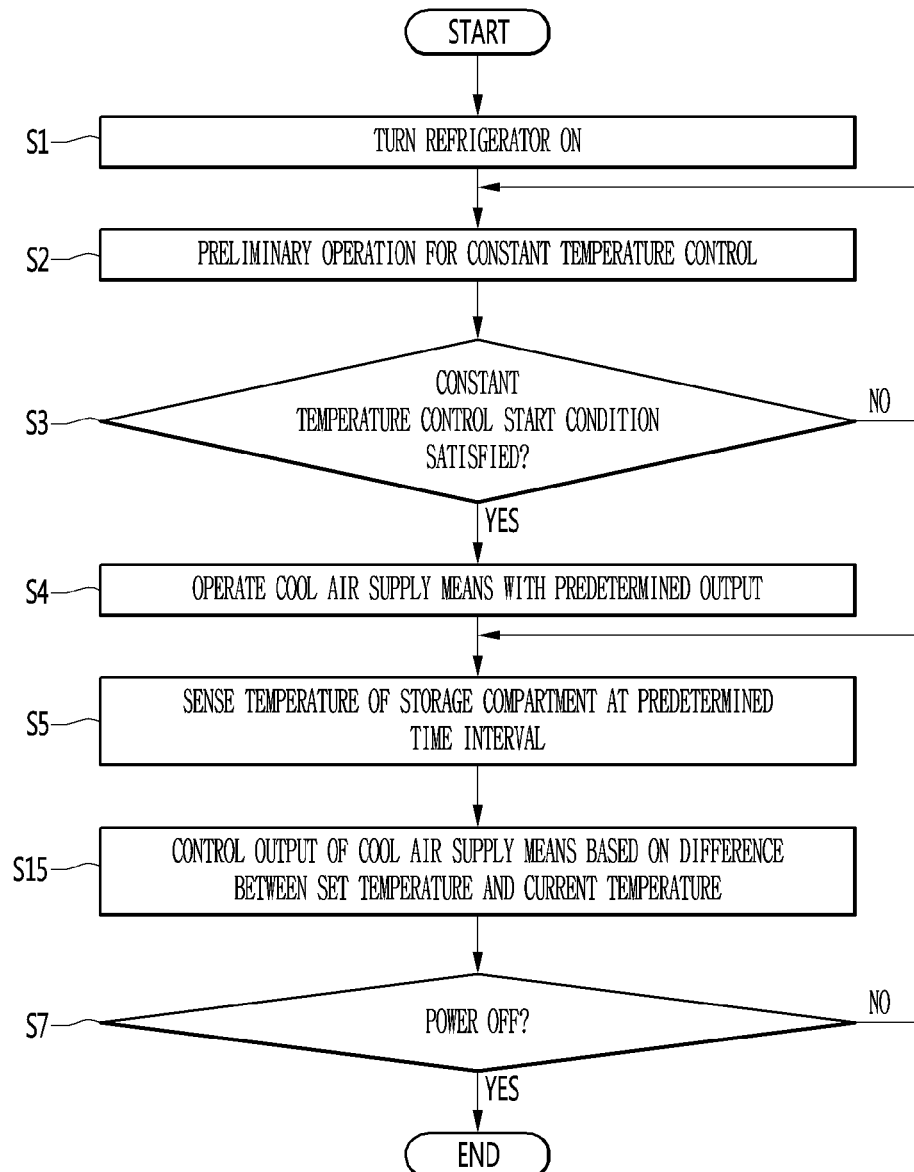

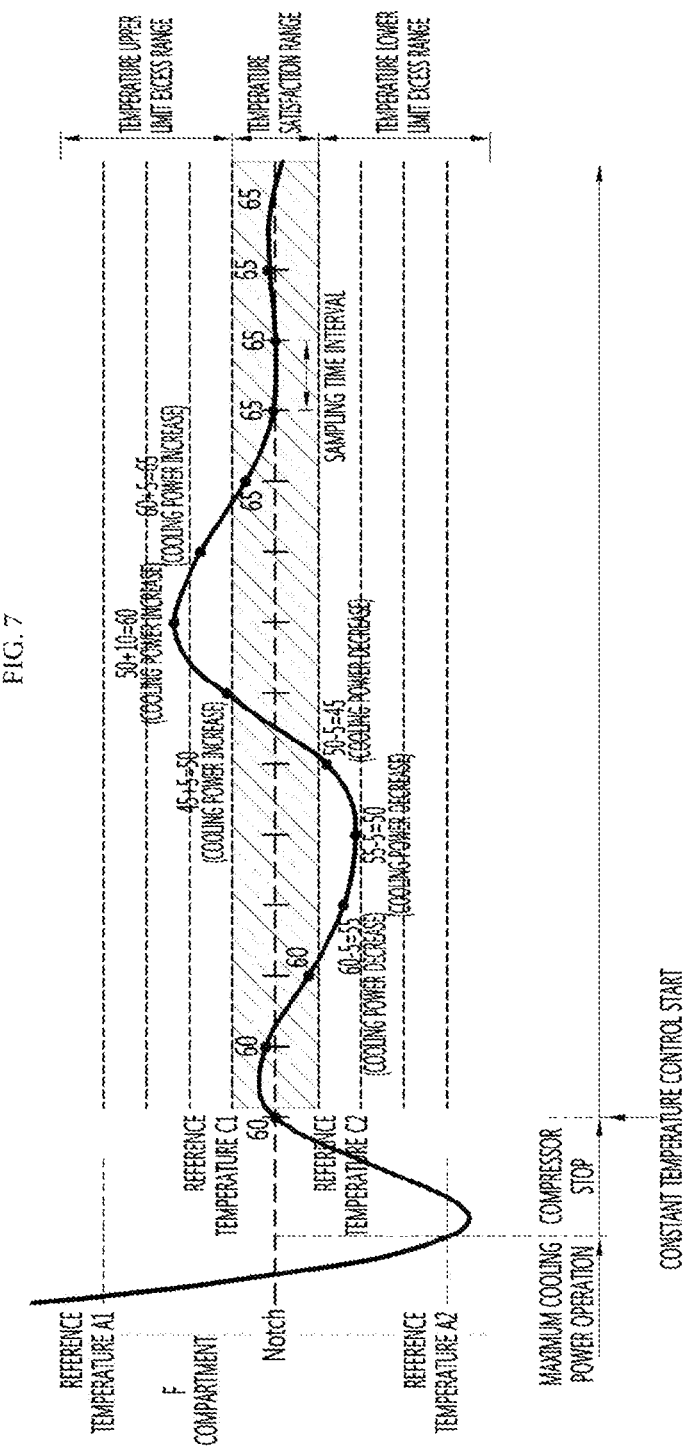

[Fig. 8]
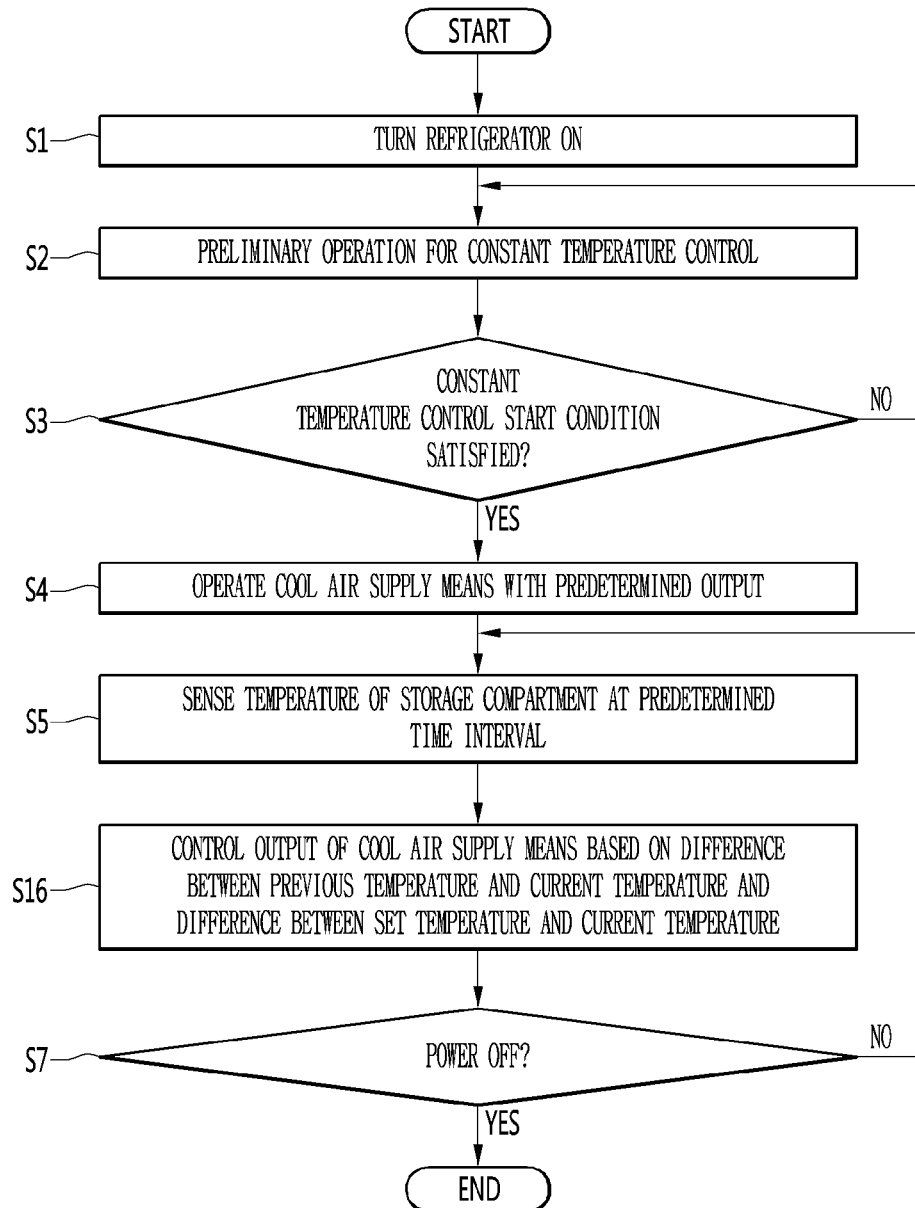

[Fig. 9]
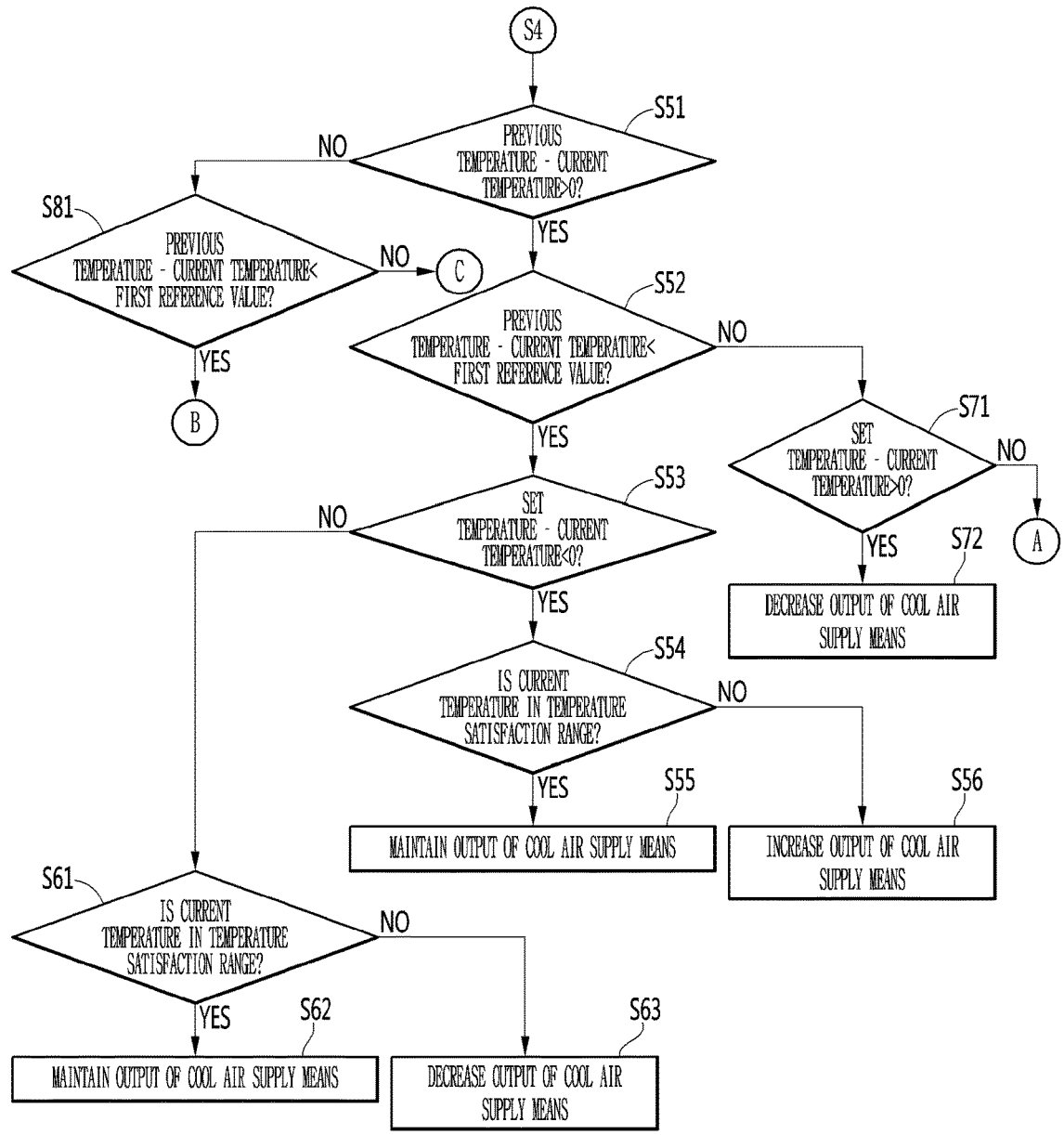
[Fig. 10]
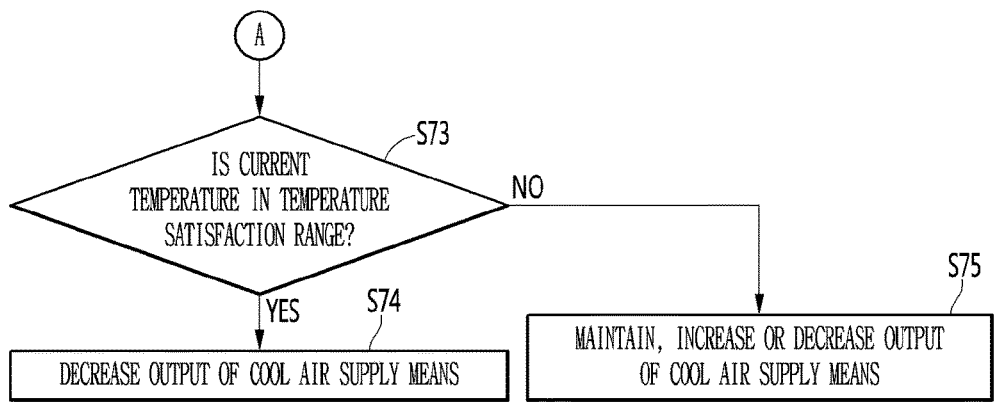

[Fig. 11]
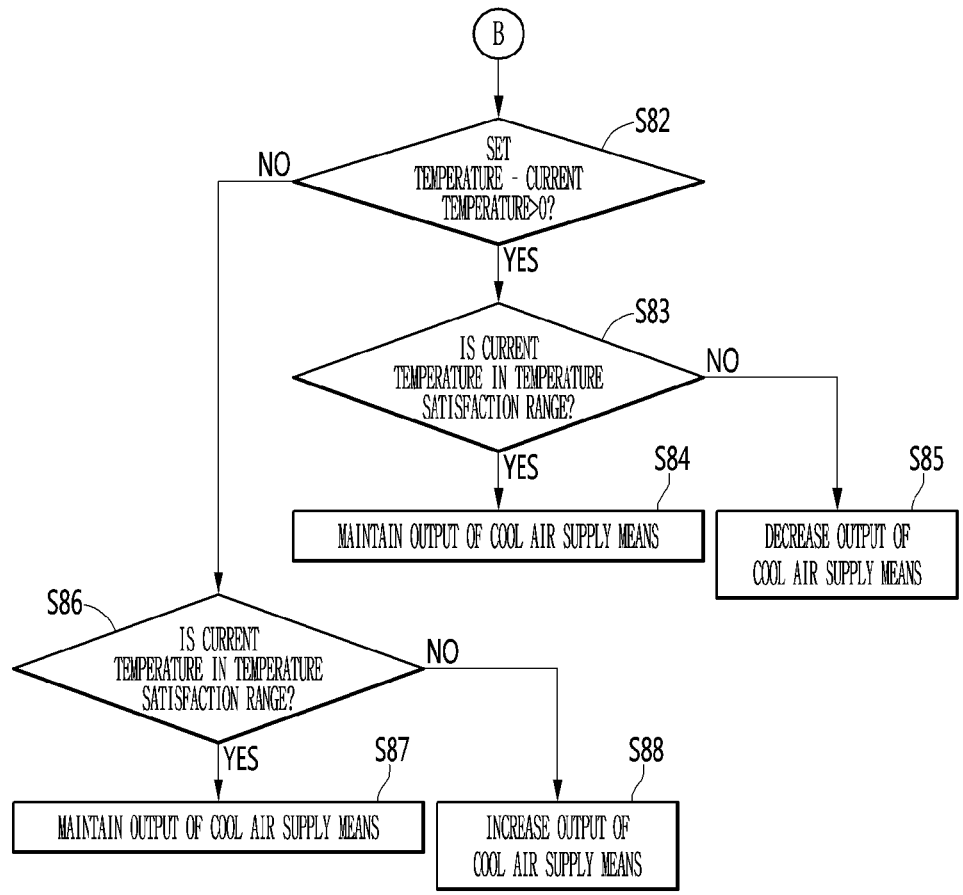
[Fig. 12]
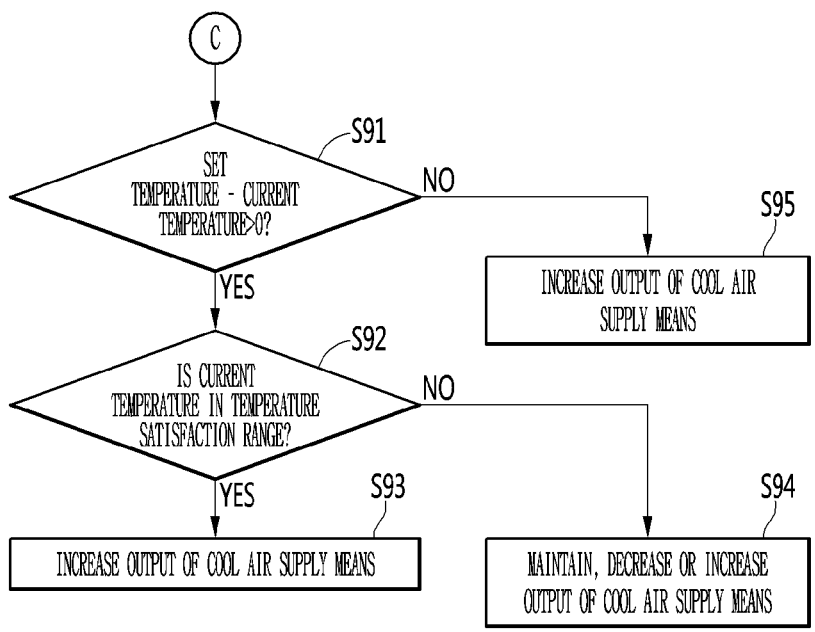

REFRIGERATOR AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2018/007636, filed Jul. 5, 2018, which claims priority to Korean Patent Application No. 10-2017-0085556, filed Jul. 5, 2017, whose entire disclosures are hereby incorporated by reference.

TECHNICAL FIELD

The present invention relates to a refrigerator and a method of controlling the same.

BACKGROUND ART

Refrigerators are home appliance for storing food at low temperature. A storage compartment needs to be kept at a constant low temperature. In the case of current household refrigerators, a storage compartment is maintained within a range between an upper limit temperature and a lower limit temperature based on a set temperature. That is, the refrigerator is controlled using a method of performing a refrigerating cycle to cool the storage compartment when the temperature of the storage compartment increases to the upper limit temperature and stopping the refrigerating cycle when the temperature of the storage compartment decreases to the lower limit temperature.

Korean Patent Laid-Open Publication No. 1997-0022182 (Publication Date: May 28, 1997) discloses a constant temperature control method for maintaining a storage compartment of a refrigerator at a constant temperature.

According to the related art, a compressor and a fan are driven and, at the same time, a storage compartment damper is fully opened when the temperature of the storage compartment is higher than a set temperature, and the compressor and the fan are stopped and, at the same time, the storage compartment is closed when the temperature of the storage compartment is cooled to the set temperature.

The method of controlling the refrigerator according to the related art has the following problems.

First, since a process of driving the compressor when the temperature of the storage compartment of the refrigerator is increased to the set temperature or higher and stopping the compressor when the temperature of the storage compartment is decreased to the set temperature or lower is repeated, change in temperature of the storage compartment is large and thus freshness of food stored in the storage compartment may be lowered.

In addition, since the compressor is repeatedly driven and stopped, power consumption is increased when the compressor is driven again.

In addition, when the storage compartment damper is fully opened, there is a high possibility that cool air is excessively supplied to the storage chamber in a state in which the damper is fully opened, thereby overcooling the storage compartment.

DISCLOSURE OF INVENTION

Technical Problem

An object of the present invention devised to solve the problem lies in a refrigerator for maintaining a storage compartment at a constant temperature in order to improve freshness of objects, and a method of controlling the same.

Another object of the present invention devised to solve the problem lies in a refrigerator capable of reducing power consumption of a cool air supply means while maintaining a storage compartment at a constant temperature, and a method of controlling the same.

Another object of the present invention devised to solve the problem lies in a refrigerator capable of rapidly returning to a constant temperature when the temperature of a storage compartment deviates from the constant temperature, and a method of controlling the same.

Solution to Problem

The object of the present invention can be achieved by providing a method of controlling a refrigerator including operating a cool air supply means with a predetermined output, a controller determining the output of the cool air supply means based on a current temperature of a storage compartment sensed by a temperature sensor while the cool air supply means operates with the predetermined output, and the controller operating the cool air supply means with the determined output.

For example, the controller may determine that the output of the cool air supply means is decreased or increased when an absolute value of a difference between a previous temperature and a current temperature of the storage compartment is equal to or greater than a first reference value, and the output of the cool air supply means may be decreased or increased again when the absolute value of the difference between a current temperature of the storage compartment sensed again after a predetermined time has elapses and the previous temperature of the storage compartment is equal to or greater than the first reference value.

For example, the controller may determine that the output of the cool air supply means is decreased when the difference between the previous temperature and the current temperature of the storage compartment is greater than 0 and the absolute value of the difference between the previous temperature and the current temperature of the storage compartment is equal to or greater than the first reference value.

The controller may determine that the output of the cool air supply means is increased when the difference between the previous temperature and the current temperature of the storage compartment is less than 0 and the absolute value of the difference between the previous temperature and the current temperature of the storage compartment is equal to or greater than the first reference value.

The controller may determine that the output of the cool air supply means is decreased or increased by a first level when the absolute value of the difference between the previous temperature and the current temperature of the storage compartment is equal to or greater than the first reference value and is less than a second reference value greater than the first reference value, and determine that the output of the cool air supply means is decreased or increased by a second level greater than the first level when the absolute value of the difference between the previous temperature and the current temperature of the storage compartment is equal to or greater than the second reference value.

A difference between the second reference value and the first reference value, and the first reference value may be equal or different.

When change in the output of the cool air supply means corresponding to the first level is referred to as a first output change value and change in the output of the cool air supply means corresponding to the second level is referred to as a second output change value, a difference between the second output change value and the first output change value may be equal to or different from the first output change value.

For example, the controller may determine that the output of the cool air supply means is maintained when the absolute value of the difference between the previous temperature and the current temperature of the storage compartment is less than the first reference value.

The cool air supply means may include one or more of a compressor configured to compress refrigerant and a fan driver configured to drive a fan for blowing air heat-exchanged with an evaporator to the storage compartment.

The storage compartment may be a refrigerating compartment, and the cool air supply means may include a damper driver configured to drive a damper provided in a duct for guiding cool air of a freezing compartment to the refrigerating compartment.

In another aspect of the present invention, provided herein is a method of controlling a refrigerator including operating a cool air supply means with a predetermined output, a controller determining the output of the cool air supply means based on a current temperature of a storage compartment sensed by a temperature sensor while the cool air supply means operates with the predetermined output, and the controller operating the cool air supply means with the determined output, wherein the controller determines that the output of the cool air supply means is decreased or increased when an absolute value of a difference between a set temperature and a current temperature of the storage compartment is equal to or greater than a first reference value, and wherein the output of the cool air supply means is decreased or increased again when the absolute value of the difference between the set temperature and a current temperature of the storage compartment sensed again after a predetermined time has elapsed is equal to or greater than the first reference value.

The first reference value may include a first upper limit reference value higher than the set temperature, and, when the current temperature is higher than the set temperature and the absolute value of the difference between the set temperature and the current temperature exceeds the first upper limit reference value, the controller may determine that the output of the cool air supply means is increased.

The first reference value may include a first lower limit reference value higher than the set temperature, and, when the current temperature is lower than the set temperature and the absolute value of the difference between the set temperature and the current temperature exceeds the first lower limit reference value, the controller may determine that the output of the cool air supply means is decreased.

The controller may determine that the output of the cool air supply means is decreased or increased by a first level when the absolute value of the difference between the set temperature and the current temperature of the storage compartment is equal to or greater than the first reference value and is less than a second reference value greater than the first reference value, and determine that the output of the cool air supply means is decreased or increased by a second level greater than the first level when the absolute value of the difference between the set temperature and the current temperature of the storage compartment is equal to or greater than the second reference value.

The controller may determine that the output of the cool air supply means is maintained when the absolute value of the difference between the set temperature and the current temperature of the storage compartment is less than the first reference value.

The cool air supply means may include one or more of a compressor configured to compress refrigerant and a fan driver configured to drive a fan for blowing air heat-exchanged with an evaporator to the storage compartment.

The storage compartment may be a refrigerating compartment, and the cool air supply means may include a damper driver configured to drive a damper provided in a duct for guiding cool air of a freezing compartment to the refrigerating compartment.

In another aspect of the present invention, provided herein is a method of controlling a refrigerator including sensing whether the refrigerator is turned on; changing an output of a cool air supply means to a predetermined first output value after the refrigerator is turned on; stopping the cool air supply means when a temperature of a storage compartment reaches an OFF reference temperature A2 lower than a set temperature of the storage compartment; a controller determining the output of the cool air supply means to a second output value lower than the predetermined first output value based on a current temperature of a storage compartment sensed by a temperature sensor when the temperature of the storage compartment reaches a predetermined temperature; and the controller operating the cool air supply means with the determined output.

The operating the cool air supply means with determined second output may include: when a range between a temperature upper limit greater than a set temperature of the storage compartment and a temperature lower limit less than the set temperature of the storage compartment is a temperature satisfaction range, the controller determining that the output of the cool air supply means is maintained when the sensed current temperature is in the temperature satisfaction range and an absolute value of a difference between a previous temperature and the current temperature of the storage compartment is less than a first reference value, and the controller changing the output of the cool air supply means when the sensed current temperature is out of the temperature satisfaction range or the absolute value of the difference between the previous temperature and the current temperature of the storage compartment is equal to or more than the first reference value.

When it is determined that a refrigerator door is opened or the cool air supply means is stopped for defrosting, the controller determines the output of the cool air supply means to a third output value different from the second output value.

The third output value may be equal to the first output value or may be less than the second output value.

Advantageous Effects of Invention

According to embodiments, since the temperature of the storage compartment can be constantly maintained, the storage period of food can be increased. That is, food stored in the storage compartment is prevented from being over-cooled or wilted.

In addition, in order to constantly maintain the temperature of the storage compartment, since a cool air supply means is not stopped and is maintained in a driving state, power consumed for initial startup of the cool air supply means can be reduced.

In addition, since the output of the cool air supply means is controlled based on a difference between a previous temperature and a current temperature and/or a difference between a set temperature and a current temperature, it is possible to rapidly return to a constant temperature when the temperature of the storage compartment deviates from the constant temperature.

BRIEF DESCRIPTION OF DRAWINGS

FIG. 6 is a flowchart illustrating a method of controlling a refrigerator according to a second embodiment of the present invention.

FIG. 7 is a graph illustrating change in temperature of a storage compartment and output control of a cool air supply means according to the second embodiment.

FIG. 8 is a flowchart illustrating a method of controlling a refrigerator according to a third embodiment of the present invention.

FIGS. 9 to 12 are flowcharts illustrating a method of controlling the output of a cool air supply means according to the third embodiment.

BEST MODE FOR CARRYING OUT THE INVENTION

Hereinafter, exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as "being connected to", "being coupled to", or "accessing" another element, one element may "be connected to", "be coupled to", or "access" another element via a further element although one element may be directly connected to or may directly access another element.

Figure 1:
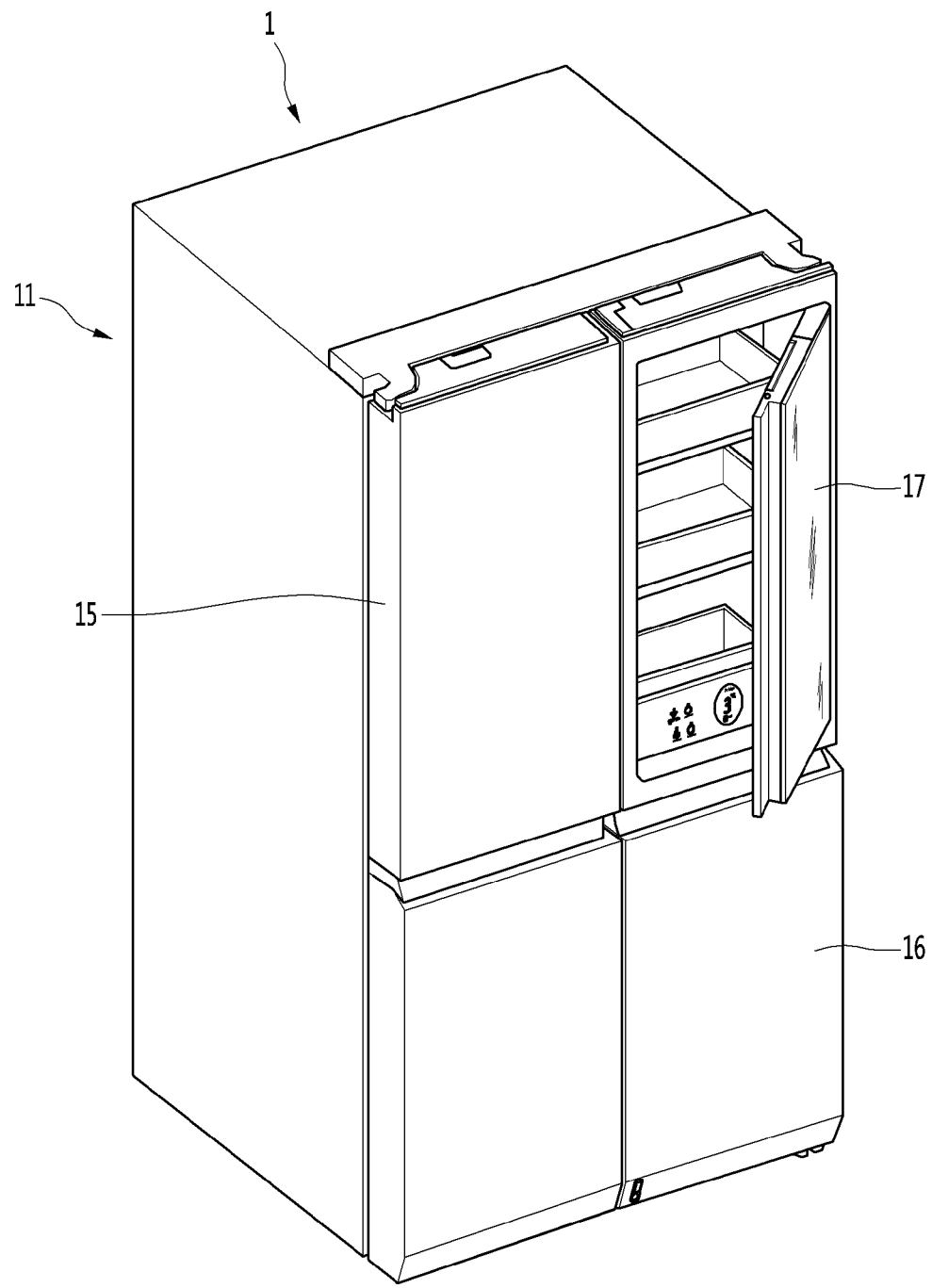
FIG. 1 is a perspective view of a refrigerator according to an embodiment of the present invention.
Figure 2:
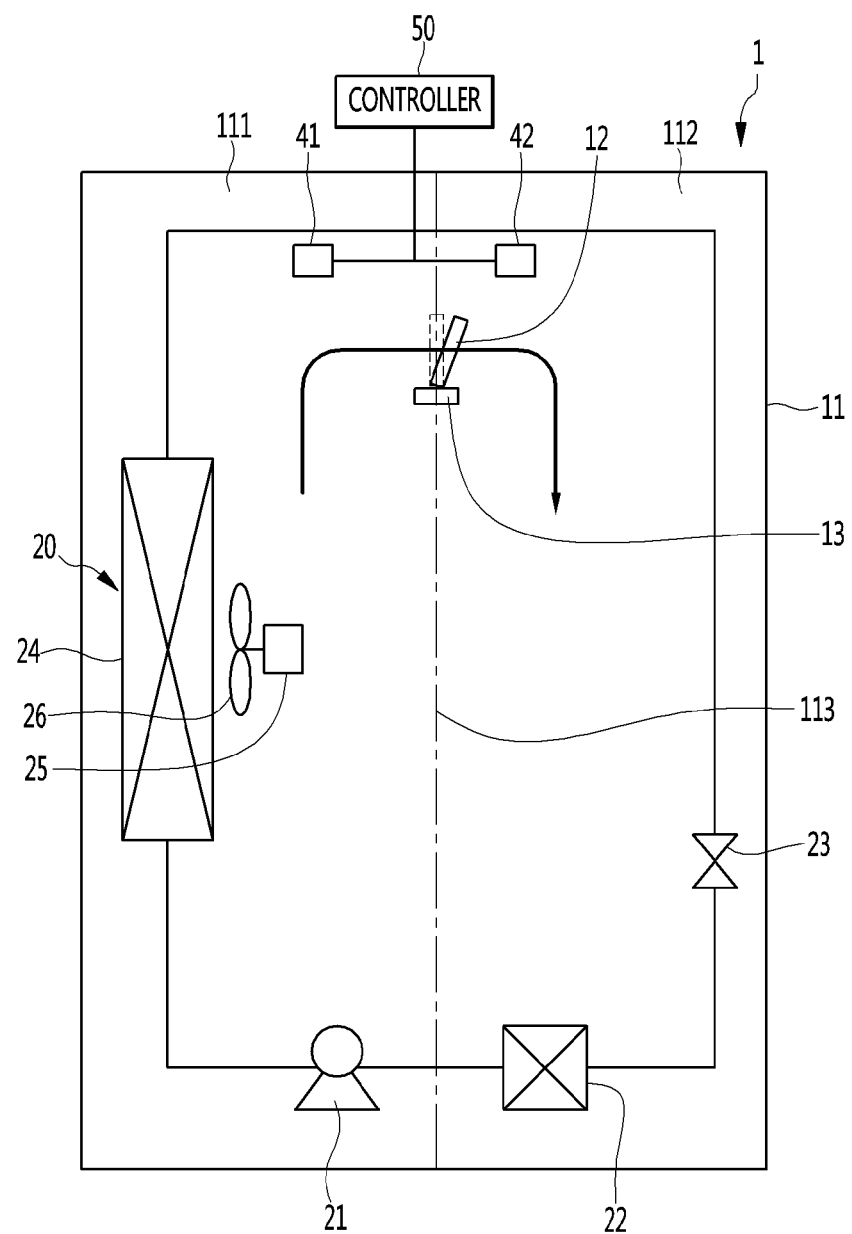
FIG. 2 is a schematic view showing the configuration of a refrigerator according to an embodiment of the present invention.
Figure 3:
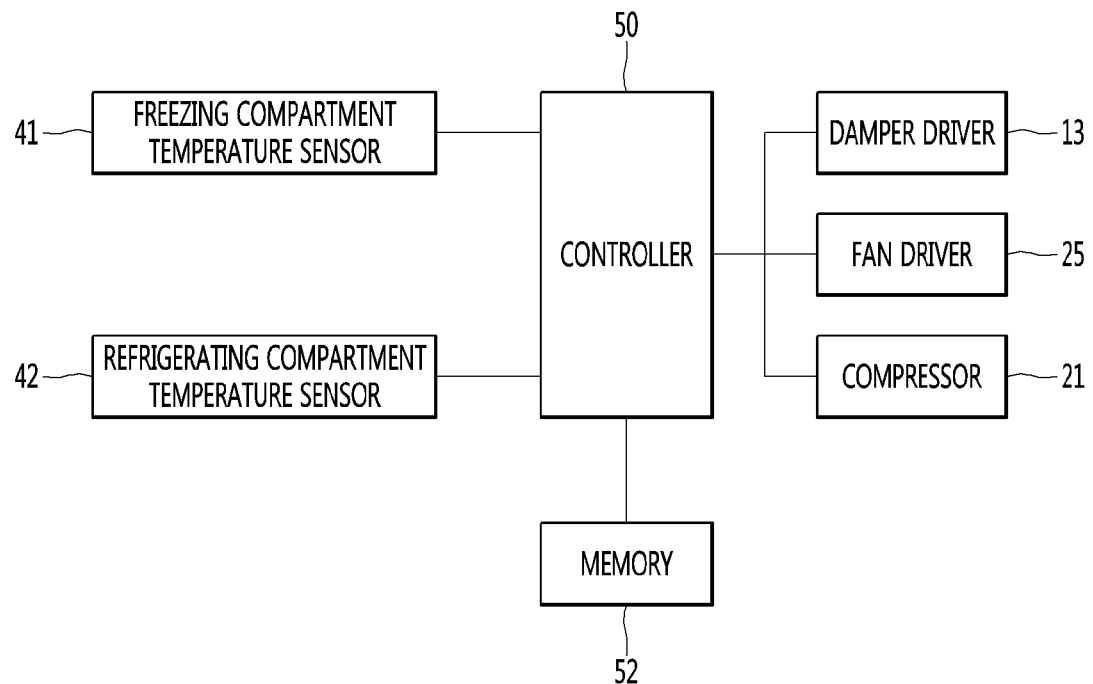
FIG. 3 is a block diagram of a refrigerator of the present invention.

FIG. 1 is a perspective view of a refrigerator according to an embodiment of the present invention, FIG. 2 is a schematic view showing the configuration of a refrigerator according to an embodiment of the present invention, and FIG. 3 is a block diagram of a refrigerator of the present invention.

Referring to FIGS. 1 to 3, the refrigerator 1 according to one embodiment of the present invention may include a cabinet 11 having a storage compartment formed therein and a storage compartment door coupled to the cabinet 11 to open and close the storage compartment.

The storage compartment includes a freezing compartment 111 and a refrigerating compartment 112. The freezing compartment 111 and the refrigerating compartment 112 may store an object such as food.

The freezing compartment 111 and the refrigerating compartment 112 may be partitioned by a partitioning wall 113 inside the cabinet 11 in a horizontal or vertical direction.

The storage compartment door may include a freezing compartment door 15 for opening and closing the freezing compartment 111 and a refrigerating compartment door 16 for opening and closing the refrigerating compartment 112. The refrigerating compartment door 16 may further include a sub door 17 for withdrawing an object stored in the refrigerating compartment door without opening the refrigerating compartment door 16, without being not limited thereto.

The partitioning wall 113 includes a connection duct (not shown) for providing a cool air passage for supplying cool air to the refrigerating compartment 112. A damper 12 may be installed in the connection duct (not shown) to open or close the connection duct.

In addition, the refrigerator 1 may further include a refrigerating cycle 20 for cooling the freezing compartment 111 and/or the refrigerating compartment 112.

Specifically, the refrigerating cycle 20 includes a compressor 21 for compressing refrigerant, a condenser 22 for condensing refrigerant passing through the compressor 21, an expansion member 23 for expanding refrigerant passing through the condenser 22, and an evaporator 24 for evaporating refrigerant passing through the expansion member 23. The evaporator 24 may include a freezing compartment evaporator, for example.

In addition, the refrigerator 1 may include a fan 26 for enabling air to flow toward the evaporator 24 for circulation of cool air in the freezing compartment 111 and a fan driver 25 for driving the fan 26.

In the present embodiment, the compressor 21 and the fan driver 25 are operated in order to supply cool air to the freezing compartment 111, and not only the compressor 21 and the fan driver 25 are operated but also the damper 12 is opened in order to supply cool air to the refrigerating compartment 112. At this time, the damper 12 may be operated by the damper driver 13.

In this specification, the compressor 21, the fan driver 25 and the damper 12 (or the damper driver) may be referred to as a "cool air supply means" which operate to supply to cool air to the storage compartment.

In this specification, when the cool air supply means includes the compressor 21 and the fan driver 25, "operating or turning on the cool air supply means" means that the compressor 21 and the fan driver 25 are turned on and "stopping or turning off the cool air supply means" means that the compressor 21 and the fan driver 25 are turned off.

In this specification, when the cool air supply means includes the compressor 21 and the fan driver 25, the output of the cool air supply means the cooling power of the compressor 21 and the rotational speed of the fan driver 25.

In addition, when the cool air supply means is the damper 12, "operating or turning on the cool air supply means" means that the damper 12 opens a flow passage such that cool air of the freezing compartment 111 flows to the refrigerating compartment 112, and "stopping or turning off the cool air supply means" means that the damper 12 closes the flow passage such that cool air of the freezing compartment 111 does not flow to the refrigerating compartment 112.

When the cool air supply means is the damper 12 (or the damper driver), increasing the output of the cool air supply means that the opening angle of the damper 12 is increased and decreasing the output of the cool air supply means that the opening angle of the damper 12 is decreased.

The refrigerator 1 may include a freezing compartment temperature sensor 41 for sensing the temperature of the freezing compartment 111, a refrigerating compartment temperature sensor 42 for sensing the temperature of the refrigerating compartment 112, and a controller 50 for controlling the cool air supply means based on the temperatures sensed by the temperature sensors 41 and 42.

The controller 50 may control one or more of the compressor 21 and the fan driver 25 in order to maintain the temperature of the freezing compartment 111 at a target temperature.

For example, the controller 50 may increase, maintain or decrease the output of the fan driver 25 and the compressor 21.

In addition, the controller 50 may increase, maintain or decrease the output of one or more of the compressor 21, the fan driver 25 and the damper 12 (or the damper driver 13) in order to maintain the temperature of the refrigerating compartment 112 at the target temperature.

For example, the controller 50 may change the opening angle of the damper 12 while the compressor 21 and the fan driver 25 are operating with constant output.

A set temperature (or a target temperature) may be stored in a memory 52. In addition, change in unit cooling power according to unit temperature may be stored.

In this specification, a temperature higher than the target temperature of the refrigerating compartment 112 may be referred to as a first refrigerating compartment reference temperature and a temperature lower than the target temperature of the refrigerating compartment 112 may be referred to as a second refrigerating compartment reference temperature.

In addition, a temperature higher than the target temperature of the freezing compartment 111 may be referred to as a first freezing compartment reference temperature and a temperature lower than the target temperature of the freezing compartment 111 may be referred to as a second freezing compartment reference temperature.

In addition, a range between the first refrigerating compartment reference temperature and the second refrigerating compartment reference temperature may be referred to as a refrigerating compartment temperature satisfaction range. A predetermined temperature between the first refrigerating compartment reference temperature and the second refrigerating compartment reference temperature may be referred to as a first set temperature. The first set temperature may be a target temperature or an average temperature of the first refrigerating compartment reference temperature and the second refrigerating compartment reference temperature.

In addition, a range between the first freezing compartment reference temperature and the second freezing compartment reference temperature may be referred to as a freezing compartment temperature satisfaction range. A predetermined temperature between the first freezing compartment reference temperature and the second freezing compartment reference temperature may be referred to as a second set temperature. The second set temperature may be a target temperature or an average temperature of the first freezing compartment reference temperature and the second freezing compartment reference temperature.

The controller 50 may control the cool air supply means such that the target temperatures of the freezing compartment 111 and/or the refrigerating compartment 112 are maintained within the temperature satisfaction ranges.

Hereinafter, a constant temperature control method of a storage compartment will be described.

Figure 4:
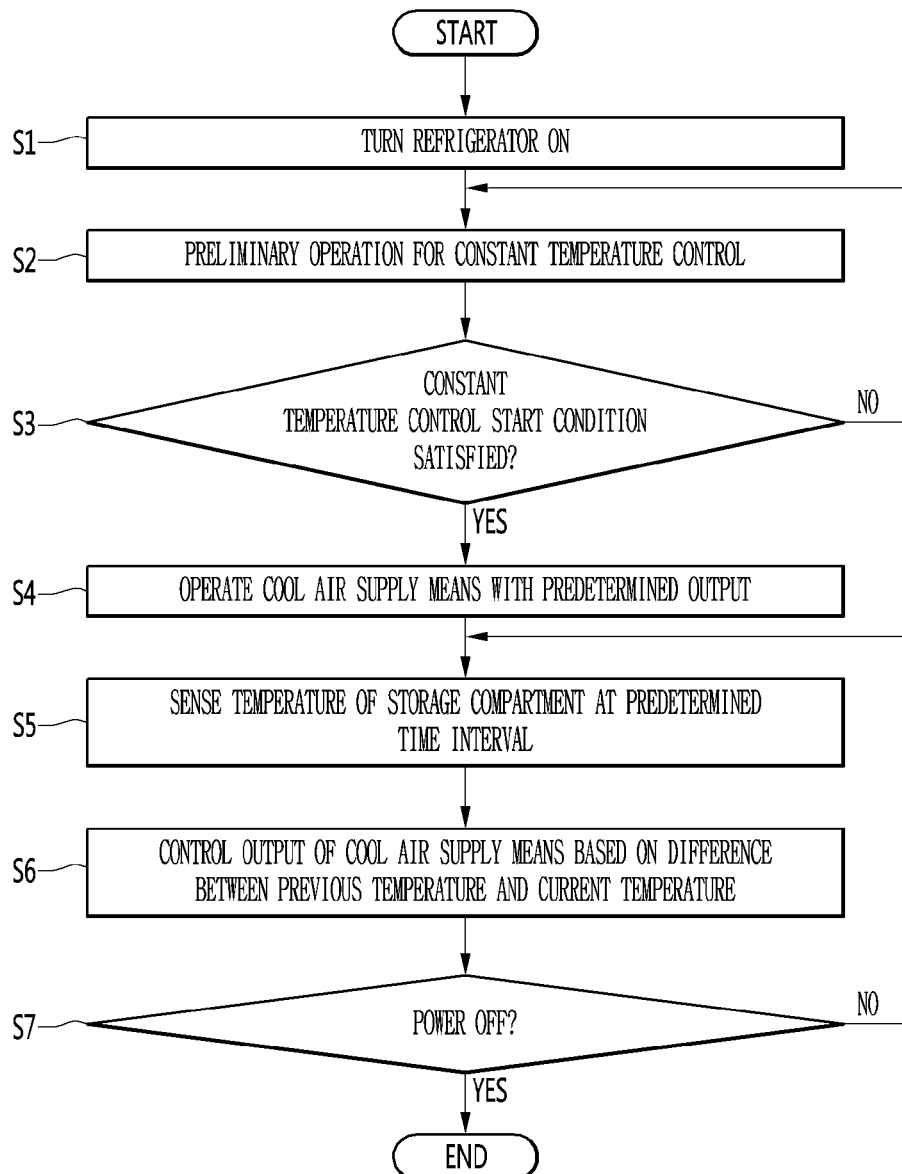
FIG. 4 is a flowchart illustrating a method of controlling a refrigerator according to a first embodiment of the present invention.

FIG. 4 is a flowchart illustrating a method of controlling a refrigerator according to a first embodiment of the present invention.

Referring to FIG. 4, the controller 50 performs preliminary operation for constant temperature control (S2), when the refrigerator 1 is turned on (S1).

In this specification, the cool air supply means may be turned on when the temperature of the storage compartment is greater than an ON reference temperature A1 and may be turned off when the temperature of the storage compartment is less than an OFF reference temperature A2.

In general, when the refrigerator 1 is turned on or the cool air supply means is turned on in a state in which the refrigerator 1 is turned off or the cool air supply means is turned off for defrosting, since the temperature of the storage compartment is higher than the ON reference temperature A1, the controller 50 may perform control such that the temperature of the storage compartment is rapidly decreased, that is, the cool air supply means operates with a predetermined first output value, for example, a maximum output value.

For example, the controller 50 may perform control such that the compressor 21 operates with maximum cooling power, and the opening angle of the damper 12 may be maximized.

When the compressor 21 operates with maximum cooling power, the temperature of the storage compartment is decreased and, when the temperature of the storage compartment becomes less than the OFF reference temperature A2, the controller 50 may stop the compressor 21. Alternatively, the controller 50 may close the damper 12.

That is, the preliminary operation step may include step of operating the cool air supply means with the maximum output and step of stopping the cool air supply means.

During the preliminary operation of the refrigerator, the controller 50 determines whether a constant temperature control start condition is satisfied (S3).

For example, the controller 50 may determine whether the temperature of the storage compartment reaches the set temperature in a state in which the cool air supply means is stopped.

In a state in which the cool air supply means is stopped, the temperature of the storage compartment is increased, and, when the temperature of the storage compartment reaches the set temperature, the controller 50 determines that the constant temperature control start condition is satisfied and performs constant temperature control of the storage compartment.

When the constant temperature control start condition is satisfied, the cool air supply means operates with predetermined output (a second output value less than the first output value) (S4). The predetermined output is between minimum output and maximum output.

In the constant temperature control step, the cool air supply means may continuously operate.

The constant temperature control step may include step S5 of sensing the temperature of the storage compartment at a predetermined time interval and step S6 of controlling the output of the cool air supply means.

In the present embodiment, the controller 50 may control the output of the cool air supply means in order to perform constant temperature control of the storage compartment and may control the output of the cool air supply means based on the temperature of the storage compartment.

Specifically, the controller 50 determines change in temperature of the storage compartment and controls the output of the cool air supply means (S6).

In the present embodiment, a difference between a previous temperature of the storage compartment (hereinafter, referred to as a "previous temperature") and a current temperature of the storage compartment (hereinafter, referred to as a current temperature) is used as change in temperature of the storage compartment.

Change in temperature of storage compartment is based on the temperature value of the storage compartment sensed at the predetermined time interval. Accordingly, the predetermined time is a sampling time for determining change in temperature.

At this time, the sampling time may be constant or changed according to a current temperature. For example, if the current temperature is located in the first temperature range, a first sampling time is applicable as a sampling time for sensing a current temperature of a next time.

In contrast, if the current temperature is located in a second temperature range, a second sampling time greater or less than the first sampling time is applicable as a sampling time for sensing a current temperature of a next time.

The controller 50 continuously perform constant temperature control unless the refrigerator 1 is turned off (S7).

Figure 5:
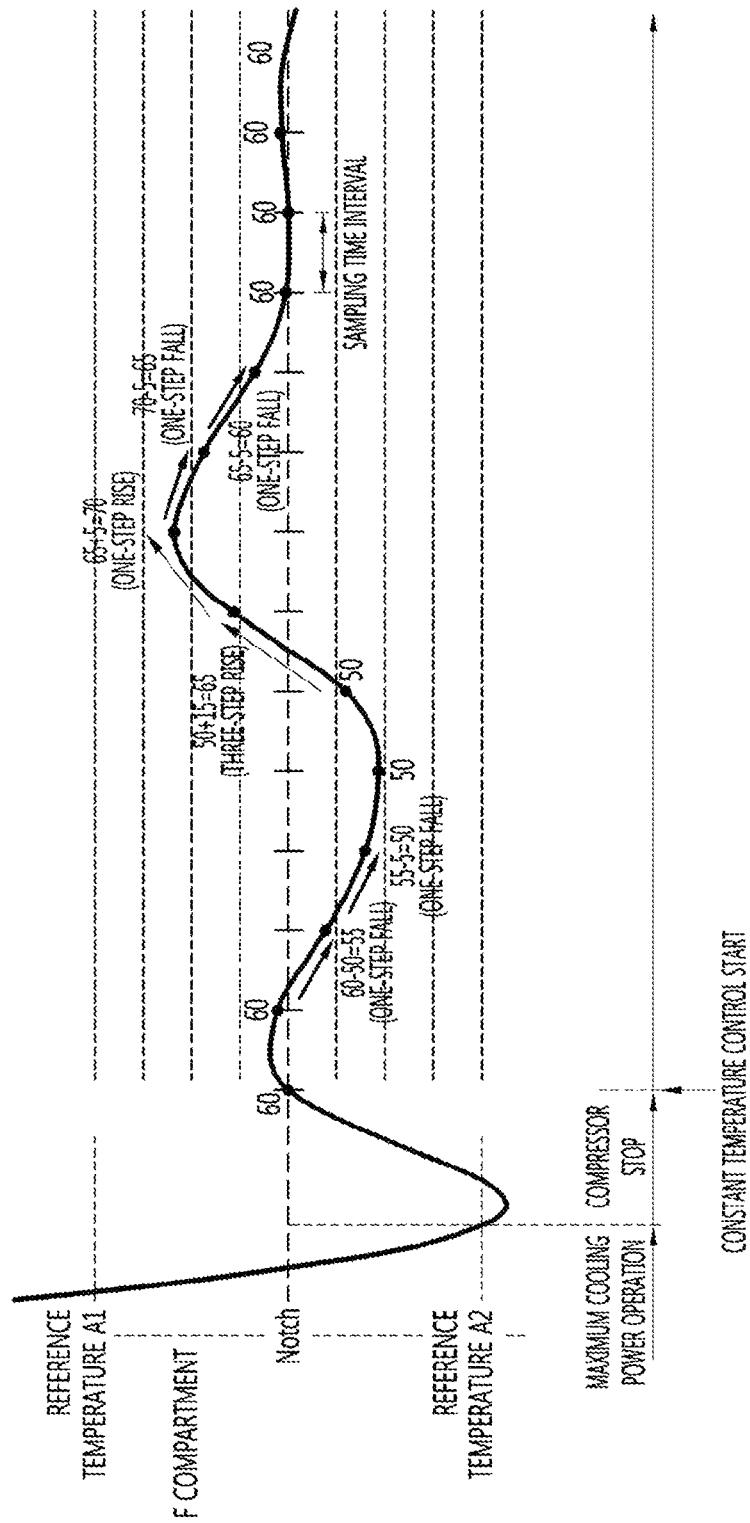
FIG. 5 is a graph illustrating change in temperature of a storage compartment and output control of a cool air supply means according to the first embodiment.

FIG. 5 is a graph illustrating change in temperature of a storage compartment and output control of a cool air supply means according to the first embodiment.

FIG. 5 shows change in cooling power of the compressor for maintaining the freezing compartment at a constant temperature and change in temperature of the freezing compartment. Numbers on the graph are examples of the cooling power of the compressor.

Hereinafter, control of the cooling power of the compressor as an example of the cool air supply means will be described.

Referring to FIG. 5, after the refrigerator is turned on or defrosting operation is finished, the compressor 21 may operate with the maximum cooling power in order to rapidly decrease the temperature of the freezing compartment. When the temperature of the freezing compartment reaches the OFF reference temperature A2, the compressor 21 is stopped.

When the compressor 21 is stopped, the temperature of the freezing compartment is increased and, when the temperature of the freezing compartment reaches the set temperature Notch, constant temperature control of the freezing compartment may start.

When constant temperature control of the freezing compartment starts, the compressor 21 operates with predetermined cooling power between minimum cooling power and maximum cooling power.

As described above, the temperature of the freezing compartment is sensed at a sampling time interval, and the controller 50 controls the cooling power of the compressor 21 based on a difference between a previous temperature and a current temperature.

For example, while the compressor 21 operates with cooling power of 60, the cooling power may be maintained (cooling power: 60), decreased (cooling power: 55 or 50) or increased (cooling power: 65 or 70), according to the temperature of the freezing compartment.

For example, when an absolute value of the difference between the previous temperature and the current temperature is less than a first reference value, the controller 50 may maintain the cooling power of the compressor 21.

Alternatively, when an absolute value of the difference between the previous temperature and the current temperature is equal to or greater than the first reference value, the controller 50 may increase or decrease the cooling power of the compressor 21.

For example, when the difference between the previous temperature and the current temperature is greater than 0 and the absolute value of the difference between the previous temperature and the current temperature is equal to or greater than the first reference value, the cooling power of the compressor 21 may be decreased by a first level.

Alternatively, when the difference between the previous temperature and the current temperature is less than 0 and the absolute value of the difference between the previous temperature and the current temperature is equal to or greater than the first reference value, the cooling power of the compressor 21 may be increased by the first level.

In the present embodiment, a plurality of reference values for comparison with the absolute value of the difference between the previous temperature and the current temperature may be set.

For example, when the difference between the previous temperature and the current temperature is greater than 0 and the absolute value of the difference between the previous temperature and the current temperature is equal to or greater than a second reference value greater than the first reference value, the cooling power of the compressor 21 may be decreased by a second level. In addition, when the absolute value of the difference between the previous temperature and the current temperature is equal to or greater than a third reference value greater than the second reference value, the cooling power of the compressor 21 may be decreased by a third level.

Alternatively, when the difference between the previous temperature and the current temperature is less than 0 and the absolute value of the difference between the previous temperature and the current temperature is equal to or greater than the second reference value greater than the first reference value, the cooling power of the compressor 21 may be increased by the second level. In addition, when the absolute value of the difference between the previous temperature and the current temperature is equal to or greater than the third reference value greater than the second reference value, the cooling power of the compressor 21 may be increased by the third level.

At this time, the differences between the reference values may be equal or different.

For example, the first reference value may be set to 0.5, the second reference value may be set to 1, and the third reference value may be set to 1.5. Alternatively, the first reference value may be set to 0.5, the second reference value may be set to 0.9, and the third reference value may be set to 1.3.

In addition, the differences between the plurality of levels may be equal or different.

For example, the first level may be set to A as a cooling power change value, the second level may be set to 2*A as a cooling power change value, and the third level may be set to 3*A as a cooling power change value. Alternatively, the first level may be set to A as a cooling power change value, the second level may be set to B (greater than A) which is not 2*A as a cooling power change value, and the third level may be set to C (greater than B) which is not 3*A as a cooling power change value.

Meanwhile, in a state in which the cooling power of the compressor 21 is decreased (for example, the cooling power is 55), the current temperature is sensed after the sampling time, and, when the difference between the previous temperature and the current temperature is greater than 0 and the absolute value of the difference between the previous temperature and the current temperature is equal to or greater than the first reference value, the cooling power of the compressor 21 may be decreased again (for example, the cooling power is 50).

In addition, in a state in which the cooling power of the compressor 21 is increased (for example, the cooling power is 65), the current temperature is sensed after the sampling time, and, when the difference between the previous temperature and the current temperature is less than 0 and the absolute value of the difference between the previous temperature and the current temperature is equal to or greater than the first reference value, the cooling power of the compressor 21 may be increased again (for example, the cooling power is 70).

As the temperature of the storage compartment is sensed at the sampling time interval and the cooling power of the cool air supply means is controlled, the temperature of the storage compartment converges to the set temperature as long as there are no external influences.

FIG. 6 is a flowchart illustrating a method of controlling a refrigerator according to a second embodiment of the present invention.

The present embodiment is equal to the previous embodiment except that the kinds of factors for controlling the refrigerator are different. Accordingly, hereinafter, the characteristic portions of the present embodiment will be described.

Referring to FIG. 6, steps S1 to S4 of the first embodiment are equally applicable to the control method of the present embodiment.

That is, when the refrigerator is turned on, the compressor is stopped after performing preliminary operation and, upon determining that the constant temperature control start condition is satisfied, constant temperature control of the storage compartment is performed.

At this time, when the constant temperature control start condition is satisfied, the temperature of the storage compartment may reach a specific temperature within the temperature satisfaction range. For example, when the temperature of the storage compartment reaches the set temperature of the storage compartment, the compressor may operate.

In the present embodiment, the constant temperature control step may include step S5 of sensing the temperature of the storage compartment at a predetermined time interval and step S15 of controlling the output of the cool air supply means.

For example, the controller 50 controls the output of the cool air supply means using the difference between the set temperature and the current temperature of the storage compartment (S15).

At this time, the controller 50 may sense the current temperature of the storage compartment at the predetermined time interval and control the output of the cool air supply means based on whether the absolute value of the difference between the set temperature and the current temperature is less than a first upper limit reference value or a first lower limit reference value.

For example, a temperature higher than the set temperature by the first upper limit reference value may be referred to as a temperature upper limit (reference temperature C1) and a temperature lower than the set temperature by the first lower limit reference value may be referred to as a temperature lower limit (reference temperature C2).

The first upper limit reference value and the first lower limit reference value may be equal or different.

The first upper limit reference value and the first lower limit reference value may be set to 0.5 or the first upper limit reference value may be greater or less than the first lower limit reference value.

When the absolute value of the difference between the set temperature and the current temperature is less than the first lower limit reference value or the first upper limit reference value, the current temperature may be lower than the temperature upper limit and higher than the temperature lower limit.

Accordingly, when the current temperature is lower than the temperature upper limit and higher than the temperature lower limit, the current temperature will be described as being located in the temperature satisfaction range.

In addition, when the current temperature is higher than the temperature upper limit, the current temperature will be described as being located in the temperature upper limit excess range and, when the current temperature is lower than the temperature lower limit, the current temperature will be described as being located in the temperature lower limit excess range.

At this time, the temperature upper limit is a temperature value lower than the ON reference temperature A1 and higher than the set temperature and the temperature lower limit is a temperature value higher than the OFF reference temperature A2 and lower than the set temperature.

The controller 50 senses the current temperature at the predetermined time interval. Accordingly, the predetermined time is a sampling time for determining change in temperature.

At this time, the sampling time may be constant or changed according to the current temperature. For example, if the current temperature is located in the temperature satisfaction range, a first sampling time is applicable as a sampling time for sensing a current temperature of a next time.

In contrast, if the current temperature is located outside the temperature satisfaction range, a second sampling time greater or less than the first sampling time is applicable as a sampling time for sensing a current temperature of a next time.

The controller 50 continuously performs constant temperature control unless the refrigerator 1 is turned off (S7).

FIG. 7 is a graph illustrating change in temperature of a storage compartment and output control of a cool air supply means according to the second embodiment.

FIG. 7 shows change in cooling power of the compressor for maintaining the freezing compartment at a constant temperature and change in temperature of the freezing compartment. Numbers on the graph are examples of the cooling power of the compressor.

Hereinafter, control of the cooling power of the compressor as an example of the cool air supply means will be described.

Referring to FIG. 7, after the refrigerator is turned on or defrosting operation is finished, the compressor 21 may operate with the maximum cooling power in order to rapidly decrease the temperature of the freezing compartment.

When the temperature of the freezing compartment reaches the OFF reference temperature A2, the compressor 21 is stopped.

When the compressor 21 is stopped, the temperature of the freezing compartment is increased and, when the temperature of the freezing compartment reaches the set temperature Notch, constant temperature control of the freezing compartment may start.

When constant temperature control of the freezing compartment starts, the compressor 21 operates with predetermined cooling power between minimum cooling power and maximum cooling power.

As described above, the temperature of the freezing compartment is sensed at a sampling time interval, and the controller 50 controls the cooling power of the compressor 21 based on a difference between the set temperature and a current temperature.

For example, while the compressor 21 operates with cooling power of 60, the cooling power may be maintained (cooling power: 60), decreased (cooling power: 55 or 50) or increased (cooling power: 65) according to the temperature of the freezing compartment.

For example, when an absolute value of the difference between the set temperature and the current temperature is less than a first upper limit reference value or a first lower limit reference value, the controller 50 may maintain the cooling power of the compressor 21.

For example, when the current temperature is located in the temperature satisfaction range, the cooling power of the compressor 21 may be maintained.

In contrast, when the current temperature is located in the temperature upper limit excess range, the cooling power of the compressor 21 may be increased. In addition, when the current temperature is located in the temperature lower limit excess range, the cooling power of the compressor 21 may be decreased.

For example, when the current temperature is located in the temperature lower limit excess range and the absolute value of the difference between the set temperature and the current temperature is greater than the first lower limit reference value and is less than the second lower limit reference value, the cooling power of the compressor 21 may be decreased by a first level.

Alternatively, when the current temperature is located in the temperature lower limit excess range and the absolute value of the difference between the set temperature and the current temperature is greater than the second lower limit reference value and is less than the third lower limit reference value, the cooling power of the compressor 21 may be decreased by a second level.

Alternatively, when the current temperature is located in the temperature lower limit excess range and the absolute value of the difference between the set temperature and the current temperature is equal to and greater than the third lower limit reference value, the cooling power of the compressor 21 may be decreased by a third level.

At this time, the second lower limit reference value is greater than the first lower limit reference value and the third lower limit reference value is greater than the second lower limit reference value.

For example, when the current temperature is located in the temperature upper limit excess range and the absolute value of the difference between the set temperature and the current temperature is greater than the first upper limit reference value and is less than the second upper limit reference value, the cooling power of the compressor 21 may be increased by a first level.

Alternatively, when the current temperature is located in the temperature upper limit excess range and the absolute value of the difference between the set temperature and the current temperature is greater than the second upper limit reference value and is less than the third upper limit reference value, the cooling power of the compressor 21 may be increased by a second level.

Alternatively, when the current temperature is located in the temperature upper limit excess range and the absolute value of the difference between the set temperature and the current temperature is equal to and greater than the third upper limit reference value, the cooling power of the compressor 21 may be increased by a third level.

In the present embodiment, the differences between the plurality of levels may be equal or different.

For example, the first level may be set to A as a cooling power change value, the second level may be set to 2*A as a cooling power change value, and the third level may be set to 3*A as a cooling power change value. Alternatively, the first level may be set to A as a cooling power change value, the second level may be set to B (greater than A) which is not 2*A as a cooling power change value, and the third level may be set to C (greater than B) which is not 3*A as a cooling power change value.

In addition, in the present embodiment, the differences between the plurality of upper limit reference values or the plurality of lower limit reference values may be equal or different.

For example, the first upper limit reference value may be set to 0.5, the second upper limit reference value may be set to 1, and the third upper limit reference value may be set to 1.5. Alternatively, the first upper limit reference value may be set to 0.5, the second upper limit reference value may be set to 0.9, and the third upper limit reference value may be set to 1.3.

Meanwhile, in a state in which the cooling power of the compressor 21 is decreased (for example, the cooling power is decreased from 60 to 55), the current temperature is sensed after the sampling time, and when the current temperature is located in the temperature lower limit excess range (for example, when the absolute value of the difference between the set temperature and the current temperature is greater than the first lower limit reference value and is less than the second lower limit reference value), the cooling power of the compressor 21 may be decreased again (for example, the cooling power is decreased from 55 to 50).

In addition, in a state in which the cooling power of the compressor 21 is increased (for example, the cooling power is decreased from 45 to 50), the current temperature is sensed after the sampling time, and when the current temperature is located in the temperature upper limit excess range (for example, when the absolute value of the difference between the set temperature and the current temperature is greater than the second upper limit reference value and is less than the third upper limit reference value), the cooling power of the compressor 21 may be increased again (for example, the cooling power is increased from 50 to 60).

As the temperature of the storage compartment is sensed at the sampling time interval and the cooling power of the cool air supply means is controlled, the temperature of the storage compartment converges to the set temperature as long as there are no external influences.

FIG. 8 is a flowchart illustrating a method of controlling a refrigerator according to a third embodiment of the present invention.

The present embodiment is equal to the previous embodiments except that the kinds of factors for controlling the refrigerator are different. Accordingly, hereinafter, the characteristic portions of the present embodiment will be described.

Referring to FIG. 8, steps S1 to S4 of the first embodiment are equally applicable to the control method of the present embodiment.

That is, when the refrigerator is turned on, the cool air supply means is stopped after performing preliminary operation and, upon determining that the constant temperature control start condition is satisfied, constant temperature control of the storage compartment is performed.

At this time, when the constant temperature control start condition is satisfied, the temperature of the storage compartment may reach a specific temperature within the temperature satisfaction range. For example, when the temperature of the storage compartment reaches the set temperature of the storage compartment, the cool air supply means may operate.

In the present embodiment, the constant temperature control step may include step S5 of sensing the temperature of the storage compartment at a predetermined time interval and step S16 of controlling the output of the cool air supply means.

In the present embodiment, the controller 50 controls the output of the cool air supply means in order to perform constant temperature control of the storage compartment. The controller 50 controls the output of the cool air supply means based on the temperature of the storage compartment. For example, the controller 50 may control the output of the cool air supply means such that the temperature of the storage compartment is maintained within the temperature satisfaction range.

Specifically, the controller 50 controls the output of the cool air supply means using the change in temperature of the storage compartment described in the first embodiment and the difference between the set temperature and the current temperature of the storage compartment described in the second embodiment (S16).

Accordingly, hereinafter, the terms used in the first embodiment and the terms used in the second embodiment are equally used.

In the present embodiment, as change in temperature of the storage compartment, the difference between the previous temperature and the current temperature is used. Change in temperature of the storage compartment is based on the temperature value of the storage compartment sensed at a predetermined time interval. Accordingly, the predetermined time is a sampling time for determining change in temperature.

The output of the cool air supply means may be decreased, maintained or increased according to a first factor (the difference between the previous temperature and the current temperature) for controlling the output of the cool air supply means and a second factor (the difference between the set temperature and the current temperature).

For example, the controller 50 determines whether the output of the cool air supply means is increased, maintained or decreased based on the first factor, determines whether the output of the cool air supply means is increased, maintained or decreased based on the second factor, and then finally determines whether the output of the cool air supply means is increased, maintained or decreased by combining the results.

For example, upon determining that the output of the cool air supply means is maintained based on the first factor and determining that the output of the cool air supply means is increased based on the second factor, the output of the cool air supply means is finally increased.

Upon determining that the output of the cool air supply means is maintained based on the first factor and determining that the output of the cool air supply means is decreased based on the second factor, the output of the cool air supply means is finally decreased.

Upon determining that the output of the cool air supply means is maintained based on the first factor and the second factor, the output of the cool air supply means is finally maintained.

Upon determining that the output of the cool air supply means is increased based on the first factor and determining that the output of the cool air supply means is maintained based on the second factor, the output of the cool air supply means is finally increased.

Upon determining that the output of the cool air supply means is decreased based on the first factor and determining that the output of the cool air supply means is maintained based on the second factor, the output of the cool air supply means is finally decreased.

Upon determining that the output of the cool air supply means is increased based on the first factor and the second factor, the output of the cool air supply means is finally increased.

Upon determining that the output of the cool air supply means is decreased based on the first factor and the second factor, the output of the cool air supply means is finally decreased.

Upon determining that the output of the cool air supply means is decreased based on the first factor and determining that the output of the cool air supply means is increased based on the second factor, the output of the cool air supply means may be finally maintained, increased or decreased according to the level of the decreased output determined based on the first factor and the level of the increased output determined based on the second factor.

Upon determining that the output of the cool air supply means is increased based on the first factor and determining that the output of the cool air supply means is decreased based on the second factor, the output of the cool air supply means may be finally maintained, increased or decreased according to the level of the increased output determined based on the first factor and the level of the decreased output determined based on the second factor.

In addition, after the output of the cool air supply means is determined, the determined output is maintained during the sampling time and, when the sampling time has elapsed, the output of the cool air supply means is determined again. That is, the output of the cool air supply means may be controlled at the sampling time interval. In addition, the controller controls the cool air supply means such that the cool air supply means operates with the determined output during the sampling time.

The controller 50 continuously performs constant temperature control unless the refrigerator 1 is turned off (S7).

Hereinafter, for example, a detailed method of controlling the output of the cool air supply means for constant temperature control will be described.

FIGS. 9 to 12 are flowcharts illustrating the method of controlling the output of the cool air supply means according to the third embodiment.

At a constant temperature control start time, the output of the cool air supply means may be set to a predetermined output between a minimum output and a maximum output (hereinafter, referred to as an initial output).

Referring to FIGS. 9 to 12, the controller 50 performs control such that the cool air supply means operate with the initial output in order to perform constant temperature control in a state in which the current temperature of the storage compartment reaches the set temperature. For example, the compressor and the fan driver may operate with initial output and the damper 12 may be opened at an initial angle greater than 0.

When the sample time has elapsed while the cool air supply means operates with the initial output, the temperature of the storage compartment is sensed by the temperature sensors 41 and 42.

Next, the controller 50 determines whether a difference between the previous temperature and the current temperature of the storage compartment sensed by the temperature sensors 41 and 42 is greater than 0 (S51). Here, the previous temperature upon initial constant temperature control may be a set temperature.

If the difference between the previous temperature and the current temperature is greater than 0, the temperature of the storage compartment is decreased.

Upon determining that the difference between the previous temperature and the current temperature is greater than 0 in step S51, the controller 50 determines whether the difference between the previous temperature and the current temperature is less than a first reference value (S52).

Upon determining that the difference between the previous temperature and the current temperature is less than the first reference value in step S52, the controller 50 determines that the output of the cool air supply means is maintained as a result of determination based on the first factor.

Next, the controller 50 determines whether the difference between the set temperature and the current temperature is less than 0 (S53).

When the difference between the set temperature and the current temperature is less than 0, the current temperature is greater than the set temperature and, the difference between the set temperature and the current temperature is equal to or greater than 0, the current temperature is equal to or less than the set temperature.

Upon determining that the difference between the set temperature and the current temperature is less than 0 in step S53, the controller 50 may determine whether the current temperature is in a temperature satisfaction range (S54).

When the difference between the set temperature and the current temperature is less than a unit temperature, the current temperature is close to the set temperature.

Upon determining that the current temperature is in the temperature satisfaction range in step S54, the controller 50 determines that the output of the cool air supply means is maintained as the result of determination based on the second factor.

Accordingly, the controller 50 finally determines that the current output of the cool air supply means is maintained according to the result (S51 and S52) of determination based on the first factor and the result (S53 and S54) of determination based on the second factor (S55).

In contrast, upon determining that the current temperature is out of the temperature satisfaction range in step S54 (when the current temperature is in the temperature upper limit excess range), the controller 50 determines that the output of the cool air supply means is increased as the result of determination based on the second factor.

Accordingly, the controller 50 finally determines that the current output of the cool air supply means is increased according to the result (S51 and S52) of determination based on the first factor and the result (S53 and S54) of determination based on the second factor (S56).

At this time, when the current temperature is in the temperature upper limit excess range, the absolute value of the difference between the set temperature and the current temperature is compared with the plurality of upper limit reference values to make increase in output of the cool air supply means different.

For example, as described in the second embodiment, when the absolute value of the difference between the set temperature and the current temperature is greater than a first upper limit reference value and is less than a second upper limit reference value while the current temperature is in the temperature upper limit excess range, the output of the cool air supply means may be increased by the first level.

When the absolute value of the difference between the set temperature and the current temperature is greater than the second upper limit reference value and is less than a third upper limit reference value while the current temperature is in the temperature upper limit excess range, the output of the cool air supply means may be increased by the second level.

When the absolute value of the difference between the set temperature and the current temperature is greater than the third upper limit reference value while the current temperature is in the temperature upper limit excess range, the output of the cool air supply means may be increased by the third level.

In contrast, upon determining that the difference between the set temperature and the current temperature is equal to or greater than 0 in step S53, the controller 50 may determine that the current temperature is in the temperature satisfaction range (S61).

Upon determining that the current temperature is in the temperature satisfaction range in step S61, the controller 50 determines that the output of the cool air supply means is maintained as the result of determination based on the second factor.

Accordingly, the controller 50 finally determines that the current output of the cool air supply means is maintained according to the result (S51 and S52) of determination based on the first factor and the result (S53 and S61) of determination based on the second factor (S62).

In contrast, upon determining that the current temperature is out of the temperature satisfaction range in step S61 (when the current temperature is in the temperature lower limit excess range), the controller 50 determines that the output of the cool air supply means is decreased as the result of determination based on the second factor.

Accordingly, the controller 50 finally determines that the current output of the cool air supply means is decreased according to the result (S51 and S52) of determination based on the first factor and the result (S53 and S61) of determination based on the second factor (S63).

At this time, when the current temperature is in the temperature lower limit excess range, the absolute value of the difference between the set temperature and the current temperature is compared with the plurality of lower limit reference values to make decrease in output of the cool air supply means different.

For example, as described in the second embodiment, when the absolute value of the difference between the set temperature and the current temperature is greater than a first lower limit reference value and is less than a second lower limit reference value while the current temperature is in the temperature lower limit excess range, the output of the cool air supply means may be decreased by the first level.

When the absolute value of the difference between the set temperature and the current temperature is greater than the second lower limit reference value and is less than a third lower limit reference value while the current temperature is in the temperature lower limit excess range, the output of the cool air supply means may be decreased by the second level.

When the absolute value of the difference between the set temperature and the current temperature is greater than the third lower limit reference value while the current temperature is in the temperature lower limit excess range, the output of the cool air supply means may be decreased by the third level.

In contrast, upon determining that the difference between the previous temperature and the current temperature is equal to or greater than a first reference value in step S52, the controller 50 may determine that the output of the cool air supply means is decreased as the result of determination based on the first factor.

Next, the controller 50 may determine whether the difference between the set temperature and the current temperature is greater than 0 (S71).

Upon determining that the difference between the set temperature and the current temperature is greater than 0 in step S71, the controller 50 may determine that the output of the cool air supply means is maintained or decreased according to the difference between the set temperature and the current temperature (depending on whether the current temperature is in the temperature satisfaction range).

At this time, when the current temperature is in the temperature satisfaction range, it may be determined that the output of the cool air supply means is maintained and, when the current temperature is out of the temperature satisfaction range (when the current temperature is in the temperature lower limit excess range), the decrease level of the output of the cool air supply means may be determined according to the absolute value of the difference between the set temperature and the current temperature.

In either case, the controller 50 finally determines that the current output of the cool air supply means is decreased according to the result (S51 and S52) of determination based on the first factor and the result (S71) of based on the second factor (S72).

In contrast, upon determining that the difference between the set temperature and the current temperature is equal to or less than 0 in step S71, the controller 50 may determine whether the current temperature is in the temperature satisfaction range (S73).

Upon determining that the current temperature is in the temperature satisfaction range in step S73, the controller 50 determines that the output of the cool air supply means is maintained as the result of determination based on the second factor.

Accordingly, the controller 50 determines that the current out of the cool air supply means is decreased according to the result (S51 and S52) of determination based on the first factor and the result (S71 and S73) of determination based on the second factor (S74).

Upon determining that the current temperature is out of the temperature satisfaction range (when the current temperature is in the temperature upper limit excess range, the controller 50 determines that the output of the cool air supply means is increased as the result of determination based on the second factor.

In this case, the controller 50 may maintain, increase or decrease the output of the cool air supply means according to the result (S51 and S52) of determination based on the first factor and the result (S71 and S73) of determination based on the second factor.

For example, the output of the cool air supply means may be maintained, increased or decreased according to the level of the output of the cool air supply means decreased as the result of determination based on the first factor and the level of the output of the cool air supply means increased as the result of determination based on the second factor.

That is, when the output of the cool air supply means decreased as the result of determination based on the first factor and the output of the cool air supply means increased based on the second factor are equal, the controller 50 may determine that the output of the cool air supply means is maintained.

When the output of the cool air supply means decreased as the result of determination based on the first factor is greater than the output of the cool air supply means increased as the result of determination based on the second factor, the controller 50 may determine that the output of the cool air supply means is decreased.

When the output of the cool air supply means decreased as the result of determination based on the first factor is less than the output of the cool air supply means increased as the result of determination based on the second factor, the controller 50 may determine that the output of the cool air supply means is increased.

Meanwhile, upon determining that the difference between the previous temperature and the current temperature is equal to or less than 0 in step S51, the controller 50 may determine whether the difference between the previous temperature and the current temperature is less than a first reference value (S81).

Here, when the difference between the previous temperature and the current temperature is equal to or less than 0, the temperature of the storage compartment is maintained or is increased during the sampling time.

Upon determining that the difference between the previous temperature and the current temperature is less than the first reference value in step S81, the controller 50 determines that the output of the cool air supply means is maintained as the result of determination based on the first factor.

The controller 50 determines whether the difference between the set temperature and the current temperature is greater than 0 (S82).

Upon determining that the difference between the set temperature and the current temperature is greater than 0 in step S82, whether the current temperature is in the temperature satisfaction range is determined (S83).

Upon determining that the current temperature is in the temperature satisfaction range in step S83, the controller 50 determines that the output of the cool air supply means is maintained as the result of determination based on the second factor.

Accordingly, the controller 50 finally determines that the current output of the cool air supply means is maintained according to the result (S51 and S81) based on the first factor and the result (S82 and S83) based on the second factor (S84).

In contrast, upon determining that the current temperature is out of the temperature satisfaction range in step S83 (when the current temperature is in the temperature lower limit excess range), the controller 50 determines that the output of the cool air supply means is decreased as the result of determination based on the second factor.

Accordingly, the controller 50 finally determines that the current output of the cool air supply means is decreased according to the result (S51 and S81) based on the first factor and the result (S82 and S83) based on the second factor (S85).

Meanwhile, upon determining that the difference between the set temperature and the current temperature is equal to or less than 0 in step S82, the controller 50 determines whether the current temperature is in the temperature satisfaction range (S86).

Upon determining that the current temperature is in the temperature satisfaction range in step S86, the controller 50 determines that the output of the cool air supply means is maintained as the result of determination based on the second factor.

Accordingly, the controller 50 finally determines that the current output of the cool air supply means is maintained according to the result (S51 and S81) based on the first factor and the result (S82 and S83) based on the second factor (S85).

In contrast, upon determining that the current temperature is out of the temperature satisfaction range (when the current temperature is in the temperature upper limit excess range), the controller 50 may determine the increase level of the output of the cool air supply means according to the comparison between the absolute value of the difference between the set temperature and the current temperature as the result of determination based on the second factor and the plurality of reference values.

Accordingly, the controller 50 finally determines that the current output of the cool air supply means is increased according to the result (S51 and S81) based on the first factor and the result (S82 and S83) based on the second factor (S88).

Meanwhile, upon determining that the difference between the previous temperature and the current temperature is equal to or greater than the first reference value in step S81, the controller 50 determines that the output of the cool air supply means is increased as the result of determination based on the first factor.

The controller 50 may determine that the difference between the set temperature and the current temperature is greater than 0 (S91).

Upon determining that the difference between the set temperature and the current temperature is greater than 0 in step S91, the controller 50 may determine that the current temperature is in the temperature satisfaction range (S92).

Upon determining that the current temperature is in the temperature satisfaction range in step S92, the controller 50 determines that the output of the cool air supply means is maintained as the result based on the second factor.

Accordingly, the controller 50 finally determines that the current output of the cool air supply means is increased according to the result (S51 and S81) based on the first factor and the result (S91 and S92) based on the second factor (S93).

In contrast, when the current temperature is out of the temperature satisfaction range (when the current temperature is in the temperature lower limit excess range), the controller 50 determines that the output of the cool air supply means is decreased as the result of determination based on the second factor.

In this case, the controller 50 may maintain, increase or decrease the output of the cool air supply means based on the result (S51 and S81) based on the first factor and the result (S91 and S92) based on the second factor (S94).

For example, whether the output of the cool air supply means is maintained, increased or decreased may be determined according to the output level of the cool air supply means increased based on the result based on the first factor and the output level of the cool air supply means decreased based on the result based on the second factor.

That is, when the output of the cool air supply means increased as the result based on the first factor and the output of the cool air supply means decreased based on the result based on the second factor are equal, the controller 50 may determine that the output of the cool air supply means is maintained.

When the output of the cool air supply means increased as the result based on the first factor is greater than the output of the cool air supply means decreased based on the result based on the second factor, the controller 50 may determine that the output of the cool air supply means is increased.

When the output of the cool air supply means increased as the result based on the first factor is less than the output of the cool air supply means decreased based on the result based on the second factor, the controller 50 may determine that the output of the cool air supply means is decreased.

Meanwhile, upon determining that the difference between the set temperature and the current temperature is equal to or less than 0 in step S91, the controller 50 may determine that the output of the cool air supply means is maintained or increased as the result based on the second factor according to the level of the absolute value of the difference between the set temperature and the current temperature.

At this time, when the absolute value of the difference between the set temperature and the current temperature is less than a first reference value, it may be determined that the output of the cool air supply means is maintained.

When the absolute value of the difference between the set temperature and the current temperature is equal to or greater than the first reference value, the increase level of the output of the cool air supply means may be determined according to the comparison between the absolute value of the difference between the set temperature and the current temperature and the plurality of reference values.

In either case, the controller 50 determines that the current output of the cool air supply means is increased according to the result (S51 and S52) of determination based on the first factor and the result (S71) of based on the second factor (S95).

Figure 13:
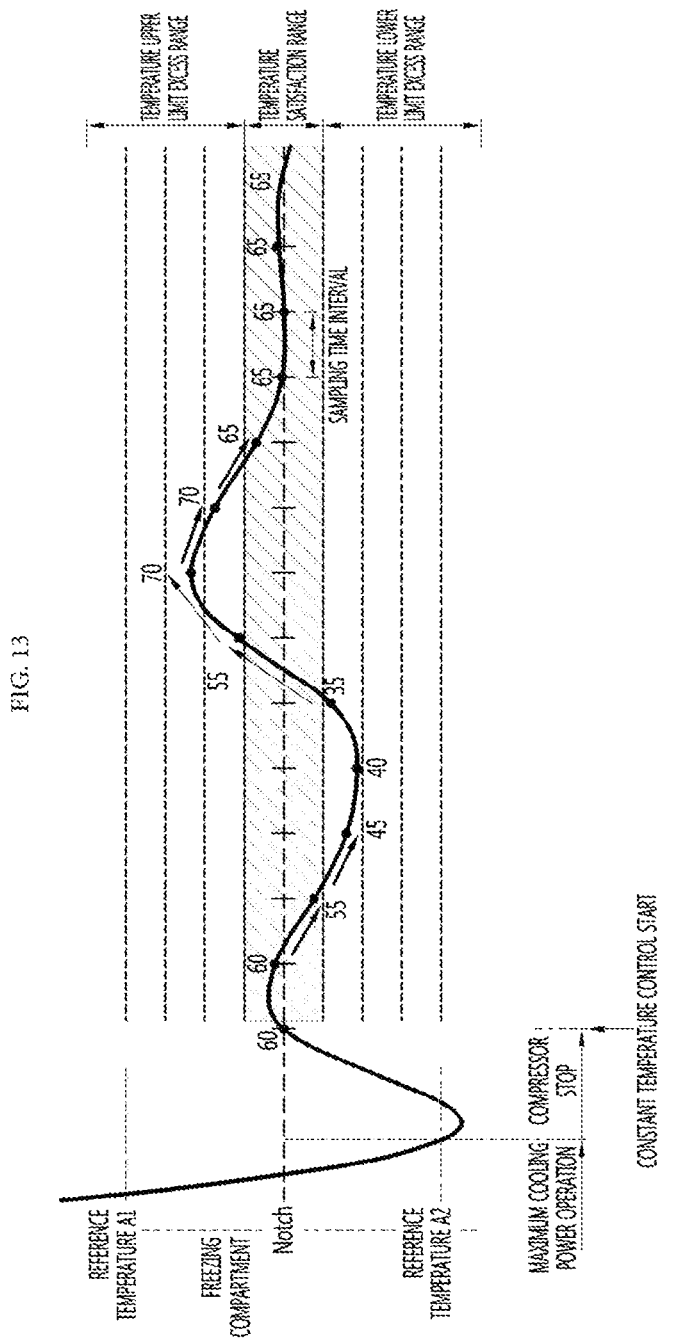
FIG. 13 is a graph illustrating change in temperature of a storage compartment and output control of a cool air supply means according to the third embodiment.

FIG. 13 is a graph illustrating change in temperature of a storage compartment and output control of a cool air supply means according to the third embodiment.

FIG. 13 shows change in cooling power of the compressor for maintaining the freezing compartment at a constant temperature and change in temperature of the freezing compartment. Numbers on the graph are examples of the cooling power of the compressor.

Referring to FIG. 13, after the refrigerator is turned on or defrosting operation is finished, the compressor 21 may operate with the maximum cooling power in order to rapidly decrease the temperature of the freezing compartment. When the temperature of the freezing compartment reaches the lower limit temperature, the compressor 21 is stopped.

When the compressor 21 is stopped, the temperature of the freezing compartment is increased and, when the temperature of the freezing compartment reaches the set temperature Notch, constant temperature control of the freezing compartment may start.

As described above, the temperature of the freezing compartment is sensed at a sampling time interval, and the controller 50 controls the cooling power of the compressor 21 based on the first factor and the second factor.

For example, while the compressor 21 operates with cooling power of 60, the cooling power may be maintained (cooling power: 60), decreased (cooling power: 55, 45, 40 or 35) or increased (cooling power: 70 or 65) according to the temperature of the freezing compartment.

At this time, when the door of the refrigerator is opened to increase the temperature of the storage compartment or when food is further introduced into the storage compartment, the storage compartment is overheated and, when the temperature of the storage compartment is equal to or greater than the reference temperature A1, the controller 50 may perform control such that the cool air supply means operates with the predetermined first output value, for example, the maximum output value, in order to rapidly decrease the temperature of the storage compartment.

For example, the controller 50 performs control such that the cool air supply means operates with the predetermined first output value, for example, the maximum output value, during the sampling time or until the temperature of the storage compartment reaches a specific temperature in the temperature satisfaction range.

As the temperature of the storage compartment is sensed at the sampling time interval and the cooling power of the cool air supply means is controlled, the temperature of the storage compartment converges to the set temperature as long as there are no external influences.

In order to maintain the temperature of the storage compartment close to the set temperature, the output of the cool air supply means may be maintained at a specific output through the output control process.

According to the proposed embodiment, since the temperature of the storage compartment can be constantly maintained, the storage period of food can be increased. That is, the food stored in the storage compartment can be prevented from being overcooled or wilted.

In addition, in order to constantly maintain the temperature of the storage compartment, since a cool air supply means is not stopped and is maintained in a driving state (continuous operation), power consumed for initial startup of the cool air supply means can be reduced.

In addition, since the output of the cool air supply means is controlled based on a difference between a previous temperature and a current temperature and/or a difference between a set temperature and a current temperature, it is possible to rapidly return to a constant temperature when the temperature of the storage compartment deviates from the constant temperature.

The invention claimed is:

1. A method of controlling a refrigerator, the method comprising:
    operating a cool air supply means with a predetermined output;
    a controller determining the output of the cool air supply means based on a current temperature of a storage compartment sensed by a temperature sensor while the cool air supply means operates with the predetermined output; and
    the controller operating the cool air supply means with the determined output,
    wherein the controller determines that the output of the cool air supply means is decreased or increased when an absolute value of a difference between a previous temperature of the storage compartment and a current temperature of the storage compartment is equal to or greater than a first reference value, and
    wherein the output of the cool air supply means is decreased or increased again when the absolute value of the difference between a current temperature of the storage compartment sensed again after a predetermined time has elapsed and the previous temperature of the storage compartment is equal to or greater than the first reference value,
    wherein the controller determines that the output of the cool air supply means is decreased or increased by a first level when the absolute value of the difference between the previous temperature and the current temperature of the storage compartment is equal to or greater than the first reference value and is less than a second reference value greater than the first reference value, and
    the controller determines that the output of the cool air supply means is decreased or increased by a second level greater than the first level when the absolute value of the difference between the previous temperature and the current temperature of the storage compartment is equal to or greater than the second reference value.

2. The method of claim 1, wherein the controller determines that the output of the cool air supply means is decreased when the difference between the previous temperature and the current temperature of the storage compartment is greater than 0 and the absolute value of the difference between the previous temperature and the current temperature of the storage compartment is equal to or greater than the first reference value.

3. The method of claim 1, wherein the controller determines that the output of the cool air supply means is increased when the difference between the previous temperature and the current temperature of the storage compartment is less than 0 and the absolute value of the difference between the previous temperature and the current temperature of the storage compartment is equal to or greater than the first reference value.

4. The method of claim 1, wherein a difference between the second reference value and the first reference value, and the first reference value are equal or different.

5. The method of claim 1, wherein, when change in the output of the cool air supply means corresponding to the first level is referred to as a first output change value and change in the output of the cool air supply means corresponding to the second level is referred to as a second output change value, a difference between the second output change value and the first output change value is equal to or different from the first output change value.

6. The method of claim 1, wherein the controller determines that the output of the cool air supply means is maintained when the absolute value of the difference between the previous temperature and the current temperature of the storage compartment is less than the first reference value.

7. The method of claim 1, wherein the cool air supply means includes one or more of a compressor configured to compress refrigerant and a fan driver configured to drive a fan for blowing air heat-exchanged with an evaporator to the storage compartment.

8. The method of claim 1,
    wherein the storage compartment is a refrigerating compartment, and
    wherein the cool air supply means includes a damper driver configured to drive a damper provided in a duct for guiding cool air of a freezing compartment to the refrigerating compartment.

9. A method of controlling a refrigerator, the method comprising:
    operating a cool air supply means with a predetermined output;

a controller determining the output of the cool air supply means based on a current temperature of a storage compartment sensed by a temperature sensor while the cool air supply means operates with the predetermined output; and the controller operating the cool air supply means with the determined output, wherein the controller determines that the output of the cool air supply means is decreased or increased when an absolute value of a difference between a set temperature and a current temperature of the storage compartment is equal to or greater than a first reference value, and wherein the output of the cool air supply means is decreased or increased again when the absolute value of the difference between the set temperature and a current temperature of the storage compartment sensed again after a predetermined time has elapses is equal to or greater than the first reference value, wherein the controller determines that the output of the cool air supply means is decreased or increased by a first level when the absolute value of the difference between the set temperature and the current temperature of the storage compartment is equal to or greater than the first reference value and is less than a second reference value greater than the first reference value, and determines that the output of the cool air supply means is decreased or increased by a second level greater than the first level when the absolute value of the difference between the set temperature and the current temperature of the storage compartment is equal to or greater than the second reference value.

10. The method of claim 9,
wherein the first reference value includes a first upper limit reference value higher than the set temperature, and wherein, when the current temperature is higher than the set temperature and the absolute value of the difference between the set temperature and the current temperature exceeds the first upper limit reference value, the controller determines that the output of the cool air supply means is increased.

11. The method of claim 9,
wherein the first reference value includes a first lower limit reference value lower than the set temperature, and wherein, when the current temperature is lower than the set temperature and the absolute value of the difference between the set temperature and the current temperature exceeds the first lower limit reference value, the controller determines that the output of the cool air supply means is decreased.

12. The method of claim 11, wherein a difference between the second reference value and the first reference value, and the first reference value are equal or different.

13. The method of claim 11, wherein, when change in the output of the cool air supply means corresponding to the first level is referred to as a first output change value and change in the output of the cool air supply means corresponding to the second level is referred to as a second output change value, a difference between the second output change value and the first output change value is equal to or different from the first output change value.

14. The method of claim 9, wherein the controller determines that the output of the cool air supply means is maintained when the absolute value of the difference between the set temperature and the current temperature of the storage compartment is less than the first reference value.

15. The method of claim 9, wherein the cool air supply means includes one or more of a compressor configured to compress refrigerant and a fan driver configured to drive a fan for blowing air heat-exchanged with an evaporator to the storage compartment.

16. The method of claim 9,
wherein the storage compartment is a refrigerating compartment, and wherein the cool air supply means includes a damper driver configured to drive a damper provided in a duct for guiding cool air of a freezing compartment to the refrigerating compartment.

17. A method of controlling a refrigerator, the method comprising:
sensing whether the refrigerator is turned on;
changing an output of a cool air supply means to a predetermined first output value after the refrigerator is turned on;
stopping the cool air supply means when a temperature of a storage compartment reaches an OFF reference temperature A2 lower than a set temperature of the storage compartment;
a controller determining the output of the cool air supply means to a second output value lower than the predetermined first output value based on a current temperature of a storage compartment sensed by a temperature sensor when the temperature of the storage compartment reaches a predetermined temperature; and
the controller operating the cool air supply means with the determined output,
wherein the operating the cool air supply means with determined second output includes:
when a range between a temperature upper limit greater than a set temperature of the storage compartment and a temperature lower limit less than the set temperature of the storage compartment is a temperature satisfaction range,
the controller determining that the output of the cool air supply means is maintained when the sensed current temperature is in the temperature satisfaction range and an absolute value of a difference between a previous temperature and the current temperature of the storage compartment is less than a first reference value, and
the controller changing the output of the cool air supply means when the sensed current temperature is out of the temperature satisfaction range or the absolute value of the difference between the previous temperature and the current temperature of the storage compartment is equal to or more than the first reference value,
when it is determined that a refrigerator door is opened or the cool air supply means is stopped for defrosting, the controller determines the output of the cool air supply means to a third output value different from the second output value.

* * * * *